United States Patent [19]
Kahle et al.

[11] Patent Number: 5,867,684
[45] Date of Patent: Feb. 2, 1999

[54] METHOD AND PROCESSOR THAT PERMIT CONCURRENT EXECUTION OF A STORE MULTIPLE INSTRUCTION AND A DEPENDENT INSTRUCTION

[75] Inventors: James A. Kahle, Austin; Albert J. Loper, Cedar Park; Soummya Mallick, Austin; Aubrey D. Ogden, Round Rock, all of Tex.

[73] Assignee: International Business Machines Corporation, Armonk, N.Y.

[21] Appl. No.: 873,013

[22] Filed: Jun. 11, 1997

Related U.S. Application Data

[62] Division of Ser. No. 526,343, Sep. 11, 1995, Pat. No. 5,694,565.

[51] Int. Cl.$^6$ .................................................. G06F 9/38
[52] U.S. Cl. ...................... 395/394; 395/392; 395/566; 395/800.23
[58] Field of Search .................................. 395/394, 561, 395/392, 800.23, 566

[56] References Cited

U.S. PATENT DOCUMENTS

| | | | |
|---|---|---|---|
| 4,493,020 | 1/1985 | Kim et al. | 395/393 |
| 4,903,196 | 2/1990 | Pomerene et al. | 395/393 |
| 5,117,490 | 5/1992 | Duxbury et al. | 395/394 |
| 5,241,626 | 8/1993 | Kohn | 395/391 |
| 5,355,457 | 10/1994 | Shebanow et al. | 395/394 |
| 5,396,610 | 3/1995 | Yoshida et al. | 711/150 |
| 5,539,911 | 7/1996 | Nguyen et al. | 395/800.23 |
| 5,559,976 | 9/1996 | Song | 395/391 |
| 5,651,125 | 7/1997 | Witt et al. | 395/394 |
| 5,664,215 | 9/1997 | Burgess et al. | 395/800.23 |

*Primary Examiner*—Kenneth S. Kim
*Attorney, Agent, or Firm*—Mark E. McBurney; Brian F. Russell; Andrew J. Dillon

[57] ABSTRACT

A method and device of executing a load multiple instruction in a superscaler microprocessor is provided. The method comprises the steps of dispatching a load multiple instruction to a load/store unit, wherein the load/store unit begins execution of a dispatched load multiple instruction, and wherein the load multiple instruction loads data from memory into a plurality of registers. The method further includes the step of maintaining a table that lists each register of the plurality of registers and that indicates when data has been loaded into each register by the executing load multiple instruction. The method concludes by executing an instruction that is dependent upon source operand data loaded by the load multiple instruction into a register of the plurality of registers indicated by the instruction as a source register, prior to the load multiple instruction completing its execution, when the table indicates the source operand data has been loaded into the source register. Also, according to the present invention, a method of executing a store multiple instruction in a superscaler microprocessor is provided. This method comprises the steps of dispatching a store multiple instruction to a load/store unit, whereupon the load/store unit begins executing the store multiple instruction, wherein the load store instruction stores data from a plurality of registers to memory; and executing a fixed point instruction that is dependent upon data being stored by the store multiple instruction from a register of the plurality of registers indicated by the fixed point instruction as a source register, prior to the store multiple instruction completing its execution, but prohibiting the executing fixed point instruction from writing to a register of the plurality of registers prior to the store multiple instruction completing.

2 Claims, 2 Drawing Sheets

| | 1 | 2 | 3 | 4 | 5 | 6 | 7 | 8 | 9 | 10 |
|---|---|---|---|---|---|---|---|---|---|---|
| Store Mult | F | Dec | Disp | E | E | E | E | C | | |
| FX Inst 1 | | F | Dec | Disp | E | | | | C | |
| FX Inst 2 | | | F | Dec | Disp | E | | | | C |
| | | | | | | | | | | |
| | | | | | | | | | | |

|            | 1 | 2   | 3    | 4   | 5    | 6 | 7    | 8 | 9 | 10 |
|------------|---|-----|------|-----|------|---|------|---|---|----|
| Load Mult  | F | Dec | Disp | E   | E    | E | E    | C |   |    |
| FX Inst 1  |   | F   | Dec  |     | Disp | E |      |   | C |    |
| FX Inst 2  |   |     | F    | Dec |      |   | Disp | E |   | C  |

*Fig. 2*

|            | 1 | 2   | 3    | 4    | 5    | 6 | 7 | 8 | 9 | 10 |
|------------|---|-----|------|------|------|---|---|---|---|----|
| Store Mult | F | Dec | Disp | E    | E    | E | E | C |   |    |
| FX Inst 1  |   | F   | Dec  | Disp | E    |   |   |   | C |    |
| FX Inst 2  |   |     | F    | Dec  | Disp | E |   |   |   | C  |

*Fig. 3*

METHOD AND PROCESSOR THAT PERMIT CONCURRENT EXECUTION OF A STORE MULTIPLE INSTRUCTION AND A DEPENDENT INSTRUCTION

This application is a divisional of application Ser. No. 08/526,343, filed Sep. 11, 1995, now issued U.S. Pat. No. 5,694,565.

BACKGROUND OF THE INVENTION

1. Technical Field:

The present invention relates in general to the allocation of resources during the execution of instructions in a microprocessor, and in particular the present invention relates to the early deallocation of resources dedicated to a serialized load/store multiple operation to allow simultaneous execution of additional instructions.

2. Description of the Related Art:

Multi-register load/store instructions require complete serialization since these instructions modify or use up to all general purpose registers (usually 32) contained within a microprocessor. In the PowerPC™ line of microprocessors produced by International Business Machines, Inc., integer load/store multiple instructions are accommodated, which move blocks of data to and from the microprocessors general purpose registers (GPRs). The multi-register instructions provided are the Load Multiple Word (lmw) and the Store Multiple Word (stmw) instructions.

In the prior art, because such multi-register load/store instructions may modify or use up to all the general purpose registers in the system, later instructions in the instruction sequence are held in the instruction buffer until the multi-register instruction is complete. Therefore, it was assumed that multi-register instructions force complete serialization of these instructions in the instruction stream. To implement such a serialization in the prior art, the multi-register instructions are allocated all of the required general purpose registers until the instruction completed. Such a system substantially restricts performance by holding up the instruction pipeline until the multi-register instruction is completed.

What is needed is a mechanism to allow resources to be deallocated from the multi-register instructions as those instructions are executed and the resources become available to allow subsequent instructions to begin execution simultaneously with the executing multi-register instruction. Such a mechanism would substantially improve the performance of a microprocessor having a superscalar design by allowing instructions that utilize multiple registers to be executed in parallel with subsequent instructions that utilize the GPRs.

SUMMARY OF THE INVENTION

According to the present invention, a method and device of executing a load multiple instruction in a superscaler microprocessor is provided. The method comprises the steps of dispatching a load multiple instruction to a load/store unit, wherein the load/store unit begins execution of a dispatched load multiple instruction, and wherein the load multiple instruction loads data from memory into a plurality of registers. The method further includes the step of maintaining a table that lists each register of the plurality of registers and that indicates when data has been loaded into each register by the executing load multiple instruction. The method concludes by executing an instruction that is dependent upon source operand data loaded by the load multiple instruction into a register of the plurality of registers indicated by the instruction as a source register, prior to the load multiple instruction completing its execution, when the table indicates the source operand data has been loaded into the source register. Also, according to the present invention, a method of executing a store multiple instruction in a superscaler microprocessor is provided. This method comprises the steps of dispatching a store multiple instruction to a load/store unit, whereupon the load/store unit begins executing the store multiple instruction, wherein the load store instruction stores data from a plurality of registers to memory; and executing a fixed point instruction that is dependent upon data being stored by the store multiple instruction from a register of the plurality of registers indicated by the fixed point instruction as a source register, prior to the store multiple instruction completing its execution, but prohibiting the executing fixed point instruction from writing to a register of the plurality of registers prior to the store multiple instruction completing.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 shows a timing diagram of the cycles required to handle the load multiple instruction and subsequent fixed-point instructions, according to the preferred embodiment of the present invention; and FIG. 3 shows a timing diagram showing the cycles in which a store multiple instruction and two fixed-point instructions are handled in the microprocessor, in accordance with the preferred embodiment of the present invention.

DETAILED DESCRIPTION OF THE PREFERRED EMBODIMENT

Figure 1:
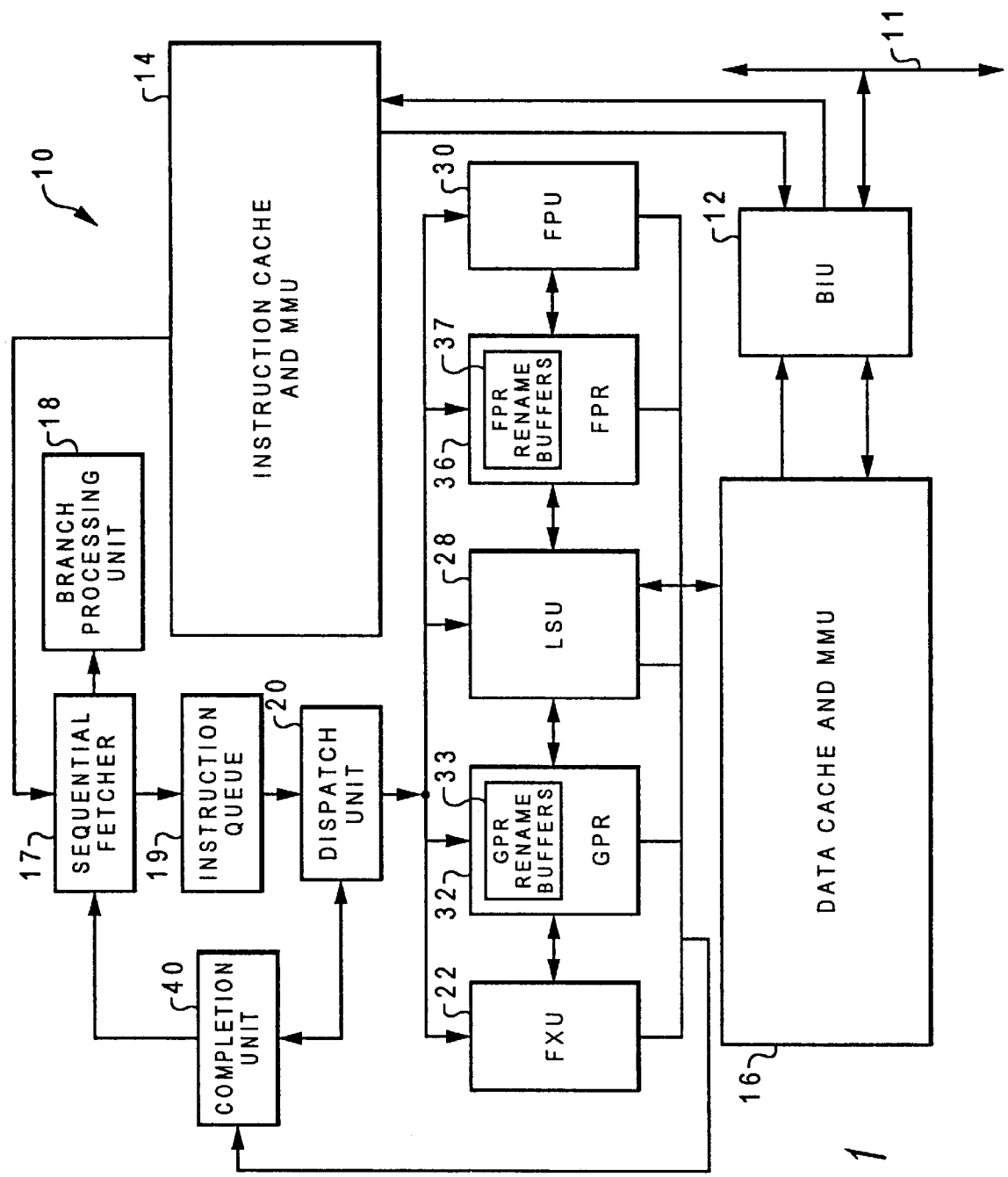
FIG. 1 illustrates a block diagram of a processor for processing information according to a preferred embodiment of the present invention.

With reference now to the figures and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors produced by International Business Machines, Inc., which operates according to reduced instruction set computing (RISC) techniques.

As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system. BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 during each cycle for execution. Sequential fetcher 17 transfers branch instructions to branch processing unit (BPU) 18 for execution, and transfers sequential instructions to instruction queue 19 for temporary storage before being executed by other execution circuitry within processor 10.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well-known to those skilled in the computer art, each of execution units 22, 28, and 30 executes one or more instructions within a particular class of sequential instructions during each processor cycle. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32 or FPRs 36, or that store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 has an rA tag and a rB tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. After execution has finished, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

In a preferred embodiment of the present invention, processor 10 is capable of executing multi-register load/store instructions, which load and store data in a plurality of general purpose registers from and to memory. In particular, in the preferred embodiment of the PowerPC™ microprocessor, microprocessor 10 will execute a load multiple instruction (lnw), which loads multiple words from memory, and a store multiple instruction (stmw), which stores multiple words to memory.

These multi-register instructions are retrieved from instruction cache 14 by sequential fetcher 17 and loaded into instruction queue 19. Upon dispatch of a multi-register instruction by dispatch unit 20, LSU 28 will begin execution of the multi-register instruction. Also, upon dispatch of the instruction, a number of registers in GPR 32 identified in the multi-register instruction are allocated to the instruction.

In the preferred embodiment, the load multiple instruction requires that up to 32 contiguous registers be loaded with up to 32 contiguous words from memory. For example, the instruction "lmw r3, r2, r1" will load registers 3–31 with data found at location <r2+r1> in memory. Thus, for this example, the first register to be loaded will be register 3 (r3). LSU 28 will then proceed to load register 4, register 5, and so on until all the registers up to and including register 31 have been loaded. At that point the load multiple instruction has finished execution. This is reported to completion unit 40, which completes the instruction by committing it to architected registers the system.

Referring to FIG. 2, there is shown a timing diagram of the cycles required to handle the load multiple instruction and subsequent fixed-point instructions. The load multiple instruction (Load Mult) is fetched (F) from instruction cache 14 by sequential fetcher 17 during cycle 1. The instruction is decoded (Dec) during cycle 2 and dispatched (Disp) by dispatch unit 20 to LSU 28 during cycle 3. LSU 28 executes (E) the load multiple instruction during cycled 4–7, and the instruction is completed (C) by completion unit 40 during cycle 8.

In this example, four general purpose registers are loaded. In a preferred embodiment, the load multiple instruction would be formatted as hnw r28, r2, r1. This instruction would load registers 28–31, and, as seen in FIG. 2, one register is loaded per system clock cycle for cycles 4–7.

In the prior art, any fixed-point instructions subsequent to the load multiple instruction would be serialized so that they would not be fetched until after the load multiple instruction completed. This enables coherency of the operand data utilized by the subsequent fixed-point instructions to be maintained. Therefore, in the example of FIG. 2, any subsequent fixed-point instructions could not be fetched until cycle 9 in the prior art.

According to the present invention, a deallocation mechanism is provided that allows fixed-point instructions waiting in the instruction buffer to be dispatched prior to completion of the load multiple instruction. As seen in FIG. 2, prior to cycle 4, registers 28–31 are allocated to the load multiple instruction. However, once register 28, for example, has been loaded by the load multiple instruction, this resource is deallocated to allow its contents to be used as operand data for subsequent instructions. As a consequence, subsequent fixed-point instructions that are dependant upon the results of the load multiple instruction can be dispatched to other functional units prior to the completion of the load multiple instruction.

Processor 10 maintains a scoreboard or table for all general purpose registers (GPR) 32 that lists each register and indicates when the load multiple instruction has loaded that associated register. Dispatch unit 20 would access the scoreboard to determine whether subsequent instructions can be dispatched. For example, as seen in FIG. 2, consider how the present invention would handle a load multiple instruction (Load Mult) followed by a first and second fixed-point instruction (FX Inst 1 and FX Inst 2). For example, consider the instruction sequence to be as follows:

lmw r28, r2, r1
add r2, r2, r28
add r3, r3, r30

(Note: the "adds" are fixed-point instructions to add the contents of a first register to the contents of a second register and store the result operand in the first register)

As can be seen in FIG. 2, FX Inst 1 can be dispatched as soon as register 28 is released by the load/store unit to the scoreboard. During cycle 4 the load/store unit has executed the load multiple instruction for register 28, so this register will be deallocated on the scoreboard. In the next subsequent cycle, dispatch unit 20 will dispatch FX Inst 1 to FXU 22 because the source operand data for this instruction is now available in the general purpose registers. This instruction is executed by FXU 22 during cycle 6, but completion unit 40 does not complete the instruction until cycle 9 in order to guarantee coherency of register data. As can be seen from FIG. 2, FX Inst 2 is fetched and decoded during cycles 3 and 4. However, dispatch unit 20 does not dispatch this instruction to FXU 22 until after the load multiple instruction has loaded register 30 during cycle 6 and has indicted this load on the scoreboard. Dispatch unit 20 reads the deallocation of register 30 and dispatches the second fixed-point instruction during cycle 7, and FXU 22 executes the instruction during cycle 8. Completion unit 40 does not complete this instruction until cycle 10 because all the fixed-point instructions must be completed in programming sequence.

As shown in this example, there has been an improvement of up to eight clock cycles to the dispatch and execution of the subsequent fixed-point instructions (assuming single ported register files and caches). This is a substantial increase in processor efficiency over the prior art. In fact, in certain examples, an improvement of up to 32 clock cycles could be realized. As will be appreciated, the enhanced performance of the present invention is only limited by the depth of the completion buffer in the completion unit as to how many instructions can be in the execute pipeline before the load-multiple completes.

According to another aspect of the present invention, early deallocation of resources is accomplished during the execution of a store multiple instruction. In the preferred embodiment, the store multiple operation requires that up to 32 contiguous registers be stored to up to 32 contiguous word locations in memory. For example, the store multiple instruction stmw r3, r2, r1 will store the contents of register 3–register 31 to the memory located at <r2+r1>. According to the present invention, upon dispatch of the store multiple instruction, additional subsequent fixed-point instructions can be dispatched to the other fixed-point execution units in the microprocessor, unconditionally. As before, these instructions must complete in programming sequence, but execution may begin immediately after dispatch of these instructions.

In the present invention, it is recognized that the store multiple instruction does not have to be serialized with subsequent fixed-point instructions. Consequently, the entire contiguous set of registers required for the store multiple instruction does not have to be allocated exclusively to that instruction, and instead can be used as a source operand resource for subsequent instructions. However, any results of the subsequent instructions must be stored in GPR rename buffers 33 until the store multiple instruction completes to prevent the writing of registers which have not yet been stored. Upon completion of the store multiple instruction, the subsequent instructions can be completed by transferring the result operands from GPR rename buffers 33 to an architected register in GPR 32.

Referring now to FIG. 3, there is shown a timing diagram of the cycles in which a store multiple instruction (Store Mult) and two fixed-point instructions (FX Inst3 and FX Inst4) are handled in the microprocessor, in accordance with the preferred embodiment of the present invention. As an example, consider the handling of the following instruction sequence:

stmw r28, r2, r1
add r2, r2, r28
add r3, r3, r30

As can be seen in FIG. 3, the store multiple instruction is fetched during cycle 1, decoded in cycle 2, dispatched in cycle 3, executed by the load/store unit 28 during cycles 4–7, and is completed in cycle 8. In accordance with the present invention, FX Inst1 and FX Inst2 are dispatched as soon as possible after the prior store multiple instruction has been dispatched in cycle 3. FX Inst1 is dispatched during cycle 4, and because only one instruction may be fetched per cycle, FX Inst2 is dispatched during cycle 5. These fixed-point instructions may execute immediately, as is done in cycles 5 and 6, because the operand data required for execution is already present in registers 28 and 30, regardless of the progress of the store multiple instruction execution. In fact, during cycle 6, LSU 28 will store the data from register 30 out to memory and FXU 22 will add the operand data contained in register 30 to the operand data contained in register 3. The results of the fixed-point instructions 1 and 2 are held in rename buffers 33 until cycles 9 and 10, respectively, at which time the result operands are stored to registers 2 and 3, respectively. As has been explained, these fixed-point instructions do not complete until after the store multiple instruction has completed in order to maintain resource coherency.

In summary, the present invention solves the substantial problem of the increased overhead associated with serialized loads and stores. Such serialization of operations requires that the microprocessor's registers be completely empty prior to dispatch of the serialized operation and that those resources remain allocated for that serialized instruction until completion. The present invention substantially increases the microprocessor performance by not requiring serialization and by allowing additional subsequent instructions to be executed simultaneously with load and store multiple instructions. Depending upon the microprocessor's completion buffer, a significant amount of additional instructions may be executed by the microprocessor during the execution of the multi-register instructions. For example, in the preferred embodiment, with a completion buffer depth of five registers, there is a potential of up to four additional instructions completing without a pipeline stall. Because such load and store multiple instructions can take up to 36 cycles to complete, the present invention provides a substantial time savings that will enhance microprocessor speed and efficiency.

While the invention has been particularly shown and described with reference to a preferred embodiment, it will be understood by those skilled in the art that various changes in form and detail may be made therein without departing from the spit and scope of the invention.

What is claimed is:

1. A method of executing multiple instructions in a processor, said method comprising the steps of:

dispatching to a load/store unit a store multiple instruction that stores data held in a plurality of registers to memory;

initiating execution of said store multiple instruction within said load/store unit;

prior to completing execution of the store multiple instruction, executing a second instruction that is dependent upon source operand data being stored to memory by the store multiple instruction from a source register among the plurality of registers, said source register being indicated by the second instruction, wherein execution of said second instruction includes performing an operation indicated by said second instruction on said source operand data within an execution unit of said processor; and prohibiting the second instruction from writing to a register among the plurality of registers prior to completion of the store multiple instruction.

2. A processor, comprising:

a plurality of registers for selectively storing data;

a load/store execution unit that executes store instructions that store data from the plurality of registers to memory;

a second execution unit for performing operations on operand data stored in source registers among the plurality of registers; and a dispatcher that dispatches instructions to the load/store execution unit and the second execution unit, wherein the dispatcher dispatches to the load/store execution unit a store multiple instruction that stores data from more than one of the plurality of registers to memory, and prior to the store multiple instruction finishing execution, dispatches to the second execution unit a second instruction that is dependent upon source operand data contained in a source register among the plurality of registers whose content is being stored to memory by the executing store multiple instruction, wherein the second execution unit executes the dispatched second instruction prior to the store multiple instruction finishing execution, but does not store the result of the executed second instruction to a register among the plurality of registers prior to the store multiple instruction finishing execution.

* * * * *